United States Patent
Sugama et al.

(10) Patent No.: US 6,968,105 B2
(45) Date of Patent: Nov. 22, 2005

(54) WAVEGUIDE-TYPE OPTICAL DEVICE AND OPTICAL SWITCH

(75) Inventors: Akio Sugama, Kawasaki (JP); Masayuki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/347,206

(22) Filed: Jan. 21, 2003

(65) Prior Publication Data

US 2003/0152329 A1   Aug. 14, 2003

(30) Foreign Application Priority Data

Feb. 14, 2002   (JP) .............................. 2002-036585

(51) Int. Cl.[7] .............................................. G02B 6/26
(52) U.S. Cl. ......................................... 385/50; 385/28
(58) Field of Search ......................... 385/27–28, 39, 385/38, 95

(56) References Cited

U.S. PATENT DOCUMENTS

| | | | | |
|---|---|---|---|---|
| 3,992,079 A | * | 11/1976 | Giallorenzi | 385/30 |
| 5,261,017 A | * | 11/1993 | Melman et al. | 385/38 |
| 5,337,380 A | * | 8/1994 | Darbon et al. | 385/28 |
| 5,459,000 A | * | 10/1995 | Unno | 430/5 |
| 6,118,915 A | * | 9/2000 | Sato | 385/39 |
| 6,434,294 B1 | * | 8/2002 | Gallo | 385/27 |
| 6,529,667 B2 | * | 3/2003 | Nashimoto | 385/129 |
| 2003/0161022 A1 | * | 8/2003 | Lazarev et al. | 359/245 |

FOREIGN PATENT DOCUMENTS

JP   2001-235645   8/2001

* cited by examiner

Primary Examiner—Frank G. Font
Assistant Examiner—Eric Wong
(74) Attorney, Agent, or Firm—Armstrong, Kratz, Quintos, Hanson & Brooks, LLP

(57) ABSTRACT

The waveguide-type optical device comprises a optical transmission element 12, an optical waveguide 20 optically connected to the optical transmission element, and a slab optical waveguide 30 formed of an electrooptic material and optically connected to the optical waveguide 20. In the waveguide-type optical device, a mode field width of the optical waveguide 20 has a value which is between a mode field width of the optical transmission element and a mode field width of the slab optical waveguide, whereby the connection loss between the optical transmission element 12, such as an optical fiber, etc. and the slab optical waveguide 30 can be small.

15 Claims, 10 Drawing Sheets

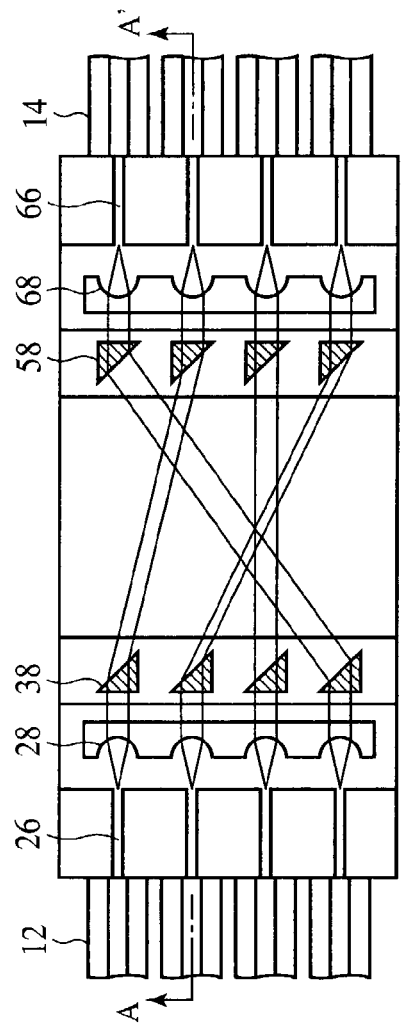
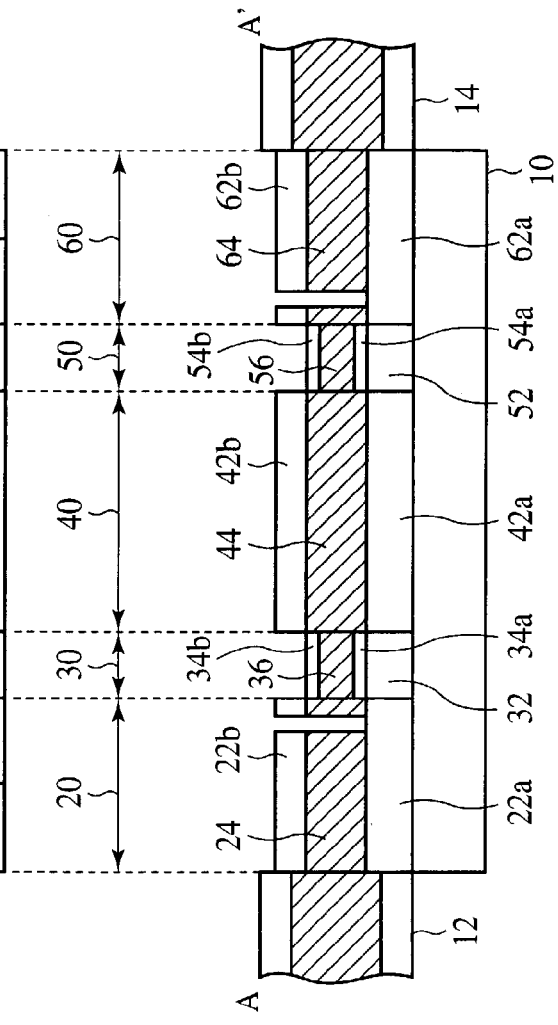
FIG. 1A
FIG. 1B

OPTICAL FIBER 12 | OPTICAL WAVEGUIDE UNIT 20 | OPTICAL DEFLECTION UNIT 30

OPTICAL FIBER | SLAB OPTICAL WAVEGUIDE

WAVEGUIDE-TYPE OPTICAL DEVICE AND OPTICAL SWITCH

CROSS-REFERENCE TO RELATED APPLICATIONS

This application is based upon and claims the benefit of priority from the prior Japanese Patent Application No. 2002-036585, filed in Feb. 14, 2002, the entire contents of which are incorporated herein by reference.

BACKGROUND OF THE INVENTION

The present invention relates to a waveguide-type optical device, such as a modulator or others, and an optical switch for changing over optical signals used in communication systems.

Because light enables high-speed data transmission, the optical communication is dominant in long-distance transmission, such as nucleus communication systems. Recently, the transmission band of the optical communication has been on increase. Coupled with the development of WDM (wavelength division multiplex) technology, this makes the optical communication increasingly speedy and allows the optical communication to have larger capacities. In the optical communication system, in order to widen a WDM network from one to one interconnection to an interconnection among a plurality of points, switches are necessary for changing over optical signals to the plurality of points.

Conventionally, as a switch for changing over optical signals, one of the type that an optical signal is converted temporarily to an electrical signal to be switched in the electric signal, and the electrical signal is converted again to the optical signal has been dominantly used. However, for above 10 Gbps of the data transfer rate, it is difficult to form devices using electrical switches. Then, in place of the electric switches, optical switches which change over paths of optical signals in light has been developed. Such optical switches make the light/electricity conversion unnecessary to thereby realize switches which do not depend on velocities (frequencies) of optical signals.

As a conventional optical switch, one using mechanical micro mirrors is known. To realize optical switches of higher integration, higher velocities and lower losses, optical switches using refractive index changes due to electrooptical effect of ferroelectrics have been developed. The latter optical switches are very prospective in terms of forming WDM networks. The electrooptical effect is a phenomenon that a refractive index of a material is changed by an applied electric field.

A typical electooptic material used in the optical switches using the electrooptical effect is lithium niobate ($LiNbO_3$). PZT ($PbZr_xTi_{1-x}O_3$), PLZT ($Pb_xLa_{1-x}(Zr_yTi_{1-y})_{1-x/4}O_3$), whose electrooptic constants are large, are also prospective.

As a structure of the optical switches using the electrooptical effect is know one that prism-shaped electrodes are disposed on the upper surface and the back surface of a slab optical waveguide comprising clad layers formed on the upper surface and the lower surface of a slab core layer of an electrooptic material. The slab optical waveguide is an optical waveguide comprising a slab-shaped core layer and no transverse waveguide structure.

When a voltage is applied between the electrodes disposed on the upper and the lower surfaces of the slab optical waveguide, a refractive index of the electrooptic material between the electrodes is changed by the electrooptical effect. Then, prism effect based on a refractive index difference between the region to which the voltage has been applied and region to which no voltage has been applied is generated, whereby a propagation direction of an optical signal can be deflected. Because a deflection angle of an optical signal is changed by a voltage applied to the electrodes, the voltage is controlled to thereby switch the optical signal to a prescribed output channel.

For the optical switches using the electrooptical effect to exert the electrooptical effect, crystal structure of the electrooptic material forming the core layer is very important, and the electrooptic material has been single crystal film, such as PZT and PLZT formed by sol-gel, CVD or others. However, it is very difficult to make thick films of these electrooptic materials, retaining their crystallinity. For practical deflection characteristics, it is necessary to make films of these electrooptic materials as thin as some $\mu m$'s.

On the other hand, the input and outputs of the optical switches are usually optical fibers of single mode of a 1.3 $\mu m$- or a 1,55 $\mu m$-wavelength and about 10 $\mu m$-mode field diameters. Accordingly, when optical fibers, or optical waveguides having the mode field diameters matched with optical fibers are connected to some $\mu m$-thick single crystal film, as shown in FIG. 1, large connection losses are generated because of large mismatch of the mode fields.

Technologies for the interconnection between mode diameters having a large difference therebetween are used in connecting, for example, semiconductor lasers and optical fibers. In the Laid-Open Japanese Patent Publication No. Hei 06-27355 (1994), for example, a tapered optical waveguide is used to thereby reduce connection losses. In the Laid-Open Japanese Patent Publication No. Hei 11-64653 (1999), it is proposed to a wedge-shape optical waveguide to thereby vertically change a mode field. These technologies are applicable only to channel optical waveguides and are not applicable to slab optical waveguides, in which light is not transversely confined.

SUMMARY OF THE INVENTION

An object of the present invention is to provide a waveguide-type optical device and an optical switch including a slab optical waveguide of an electrooptic material, in which connection losses between the optical transmission element, such as optical fibers, and a slab optical waveguide can be small.

According to one aspect of the present invention, there is provided a waveguide-type optical device comprising: an optical transmission element; an optical waveguide optically connected to the optical transmission element; and a slab optical waveguide formed of an electrooptic material and optically connected to the optical waveguide, the optical waveguide having a mode field width in a first direction vertical to a plane of the slab optical waveguide, whose value is between a mode field width of the optical transmission element and a mode field width of the slab optical waveguide.

According to another aspect of the present invention, there is provided an optical switch comprising: a plurality of input optical transmission elements; a first optical waveguide unit having a plurality of optical waveguides optically connected to said plurality of the input optical transmission elements, respectively; an optical deflection unit having a slab optical waveguide formed of an electrooptic material and optically connected to the optical waveguides of the first optical waveguide unit; and a plurality of output optical transmission elements optically connected to the slab optical waveguide of the optical deflection unit, the first optical waveguide unit respectively having a mode field width in a direction vertical to a plane of the slab optical waveguide, whose value is between a mode field width of the input optical transmission elements and a mode field width of the slab optical waveguide.

According to the present invention, the waveguide-type optical device and the optical switch including the slab optical waveguide formed of an electrooptic material comprises the optical waveguide disposed between optical transmission elements, such as optical fiber, etc. and the slab optical waveguide, whose mode field widths vertical to the substrate have a value which is between a mode field diameter of the optical fiber and a mode field width of the optical deflection unit, which is vertical to the substrate, where by the connection loss between the optical transmission elements and the slab optical waveguide can be very small.

BRIEF DESCRIPTION OF THE DRAWINGS

FIG. 1A is a plan view of the optical switch according to a first embodiment of the present invention, which shows a structure thereof.

FIG. 1B is a diagrammatic sectional view of the optical switch according to the first embodiment of the present invention, which shows a structure thereof.

DETAILED DESCRIPTION OF THE INVENTION

[A First Embodiment]

The optical switch according to a first embodiment of the present invention will be explained with reference to FIGS. 1A–1B, 2, 3, 4A–4C, 5A–5C, 6A–6B, 7A–7B, and 8A–8B.

Figure 2:
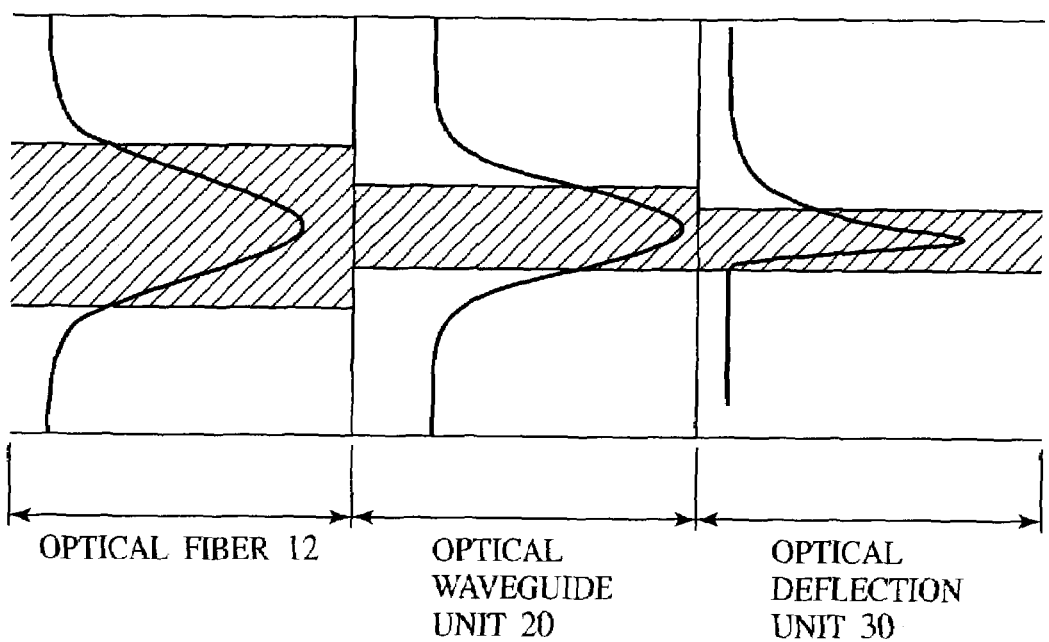
FIG. 2 is a view of changes of a mode field in the device of the optical switch according to the first embodiment of the present invention.
Figure 3:
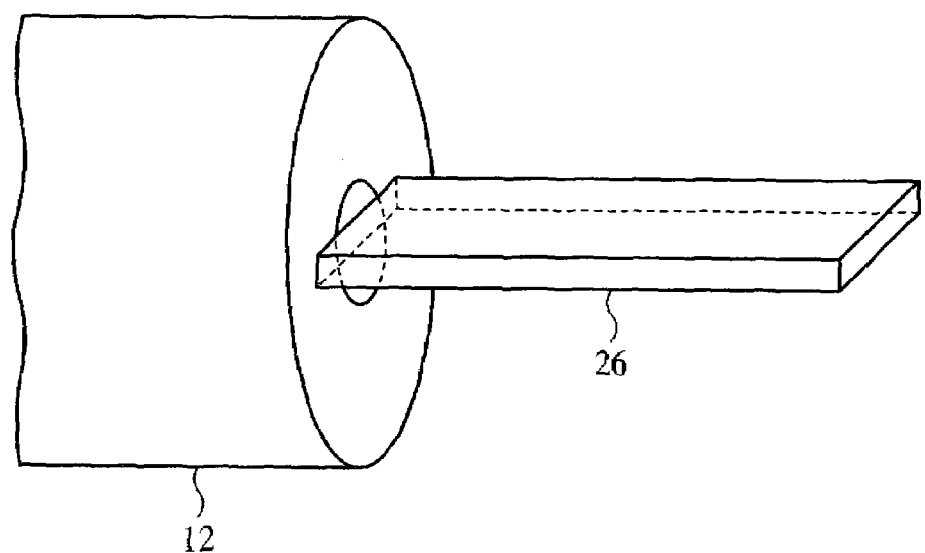
FIG. 3 is a diagrammatic view of an example of the connection between the optical fiber and a channel optical waveguide.

FIG. 1A is a plan view of the optical switch according to the present embodiment, which shows a structure thereof. FIG. 1B is a diagrammatic sectional view of the optical switch according to the present embodiment, which shows a structure thereof. FIG. 2 is a view of changes of a mode field in the device of the optical switch according to the present embodiment. FIG. 3 is a diagrammatic view of an example of the connection between an optical fiber and a channel optical waveguide. FIGS. 4A–4C, 5A–5C, 6A–6B, 7A–7B, and 8A–8B are sectional views of the optical switch according to the present embodiment in the steps of the method for fabricating the same, which show the method.

First, the structure of the optical switch according to the present embodiment will be explained with reference to FIGS. 1A and 1B.

The optical switch according to the present embodiment comprises on a common substrate 10 an input optical waveguide unit 20, a light deflection unit 30, a slab optical waveguide unit 40, a light deflection unit 50 and an output optical waveguide unit 60.

The input optical waveguide unit 20 is an optical waveguide formed of a lower clad layer 22a of a silica substrate, a core layer 24 of a silica layer of, e.g, a 5 $\mu$m-thick formed on the lower clad layer 22a and an upper clad layer 22b of a silica layer of, e.g., a 5~10 $\mu$m-thick formed on the core layer 24, and comprises a plurality of channel optical waveguides 26, and planar lenses 28 respectively disposed on one ends of the channel optical waveguides 26. A refractive index difference between the core layer 24 and the clad layers 22 is about 0.3%. Optical fibers 12 can be optically connected to the channel optical waveguides 26. The channel optical waveguide means an optical waveguide respectively having a waveguide structure which guides optical signal in parallel with and vertically to the substrate.

Near the planar lenses 28 of the input optical waveguide unit 20, the optical deflection unit 30 is disposed. The optical deflection unit 30 is a slab optical waveguide comprising an SrTiO$_3$ substrate 32, a lower clad layer 34a of PLZT (Pb$_x$La$_{1-x}$(Zr$_y$Ti$_{1-y}$)$_{1-x/4}$O$_3$) having, e.g., a 1 $\mu$m-thick and a 2.4 refractive index, a core layer 36 formed on the lower clad layer 34a and formed of PZT of, e.g., a 3 $\mu$m-thick and a 2.5 refractive index, and an upper clad layer 34b formed on the core layer 36 and formed of a PLZT film of, e.g., a 1 $\mu$m-thick and a 2.4 refractive index. Prism-shaped electrodes 38 are formed on the upper surface and the lower surface of the slab optical waveguide for the respective channels.

The slab optical waveguide unit 40 is disposed on the other side of the optical deflection unit 30. The slab optical waveguide unit 40 is an optical waveguide comprising a lower clad layer 42a of a silica substrate, a core layer 44 formed on the lower clad layer 42a and formed of a silica layer of, e.g., a 5 $\mu$m-thick, and an upper clad layer 42b of, e.g., 5~10 $\mu$m-thick formed on the core layer 44. A refractive index difference $\Delta$ between the core layers 24 and the clad layers 22 is about 0.3%.

The optical deflection unit 50 is disposed on the other side of the slab optical waveguide unit 40. The optical deflection unit 50 comprises an SrTiO$_3$ substrate 52, a lower clad layer 54a formed on the SrTiO$_3$ substrate of a PLZT film of, e.g., 1 $\mu$m-thick and a 2.4 refractive index, a core layer 56 formed on the lower clad layer 54a and having, e.g., a 3 $\mu$m-thick and a 2.5 refractive index, and an upper slab layer 54b formed on the core layer 56 and formed of a PLZT film of, e.g., a 1 $\mu$m-thick and a 3.4 refractive index. Prism-shaped electrodes 58 are formed on the upper surface and the lower surface of the slab optical waveguide for the respective channels.

The output optical waveguide unit 60 is disposed on the other side of the optical deflection unit 50. The output optical waveguide unit 60 is an optical waveguide formed of a lower clad layer 62a of a silica substrate, a core layer 64 formed on the lower clad layer 62a and formed of a silica layer of, e.g., a 5 $\mu$m-thick and an upper clad layer 62b formed on the core layer 64 of, e.g., 5~10 $\mu$m-thick, and comprises a plurality of channel optical waveguides 66, and a plurality of planar lenses 68 respectively disposed on one ends of the plurality of channel optical waveguides 66. A refractive index difference between the core layer 64 and the clad layers 62 is about 0.3%. The planar lenses 68 are positioned on the side of the optical deflection unit 50. The channel optical waveguides 66 are connected to output optical waveguides 14.

Then, the operation of the optical switch according to the present embodiment will be explained with reference to FIGS. 1A and 1B.

An optical signal incident from the input optical fiber 12 propagates through the channel optical waveguide 26 to be collimated by the planar lens 28. The collimated optical signal is incident on the optical deflection unit 30 having the slab optical waveguide formed of an electrooptic single crystal.

Pairs of prism-shaped electrodes 36 are formed respectively on the upper surface and the lower surface of the slab optical waveguide of the optical deflection unit 30. A voltage is applied between the electrodes 36 to thereby change by the electrooptical effect a refractive index of the electrooptic material sandwiched between the electrodes 36. The prism effect based on the refractive index difference between the region where the voltage applied to and the region where the no voltage applied to is generated to thereby deflect a propagating direction of the optical signal. A deflection angle of the optical signal is changed by the voltage applied to the electrodes 36. The voltage is controlled to thereby switch the optical signal to a prescribed output channel.

When the optical deflection unit 30 cannot provide alone a sufficient deflection angle, the slab optical waveguide unit 40 is disposed, whereby the optical signal is caused to propagate in the slab optical waveguide unit 40 until the respective channels are divided. On the output side, the optical deflection unit 50 and the output optical waveguide unit 60 are disposed symmetrically with the optical deflection unit 30 and the input optical waveguide unit 20. The optical signal is angularly restored by the optical deflection unit 50 and then is incident on the channel optical waveguide 66 by the planar lens 68 and enters the output optical fiber 14.

The optical switch having 4 input channels and 4 output channels is thus constituted.

The optical switch according to the present embodiment is characterized in that a mode field width of the optical waveguide unit 20, which is vertical to the common substrate 10 has a value between a mode field diameter of the optical fibers 12 and a mode field width of the optical deflection unit 30, which is vertical to the common substrate 10. The optical switch according to the present embodiment is characterized also in that a mode field width of the output optical waveguide unit 50, which is vertical to the common substrate 10 has a value which is between a mode field diameter of the optical fibers 14 and a mode field width of the optical deflection unit 50, which is vertical to the common substrate 10.

The input and the output of the optical switch are single-mode optical fibers of a 1.3 µm or a 1.55 µm wavelength and have an about 10 µm-mode field diameter. On the other hand, deflector using electrooptic materials must have the thickness of the core layers limited to below some µm's. In this case, when the optical fibers, or an optical waveguide having the mode field diameter matched with the optical fibers are connected to a some µm-thick single crystal film, mismatch of the mode fields is too large, which generates large connection losses.

In the optical switch according to the present embodiment, however, the optical waveguide units are designed so that a mode field width of the optical waveguide units positioned between the optical fibers and the optical deflection units, which is vertical to the substrate has a value between a mode field diameter of the optical fibers and a mode field width of the optical deflection units, which is vertical to the substrate. Accordingly, connection losses between the optical fibers and the optical deflection units can be much decreased.

The mode field width changes depending on the wavelength of the optical signal, core size (thickness of the core layer) and refractive index difference between the core and the clad. Among these parameters, the wavelength of the optical signal cannot be changed. Accordingly, one or both of the rest parameters are suitably controlled, whereby a mode field width which is between a mode field diameter of the optical fibers and a mode field width of the optical deflection units can be realized.

In the optical switch according to the present embodiment, a refractive index difference between the core layer and the clad layer of the optical fiber, and a refractive index difference between the core layer and the clad layer of the optical waveguide unit are both about 0.3%. In the optical switch according to the present embodiment, as shown in FIG. 2, a thickness of the core layer of the optical waveguide unit is set to be substantially middle between a core diameter of the optical fiber and a thickness of the core layer of the optical deflection unit, whereby a mode field width of the optical waveguide unit positioned between the optical fiber and the optical deflection unit, which is vertical to the substrate is controlled to have a value which is between a mode field width of the optical fiber and a mode field width of the optical deflection unit, which is vertical to the substrate.

Figure 11:
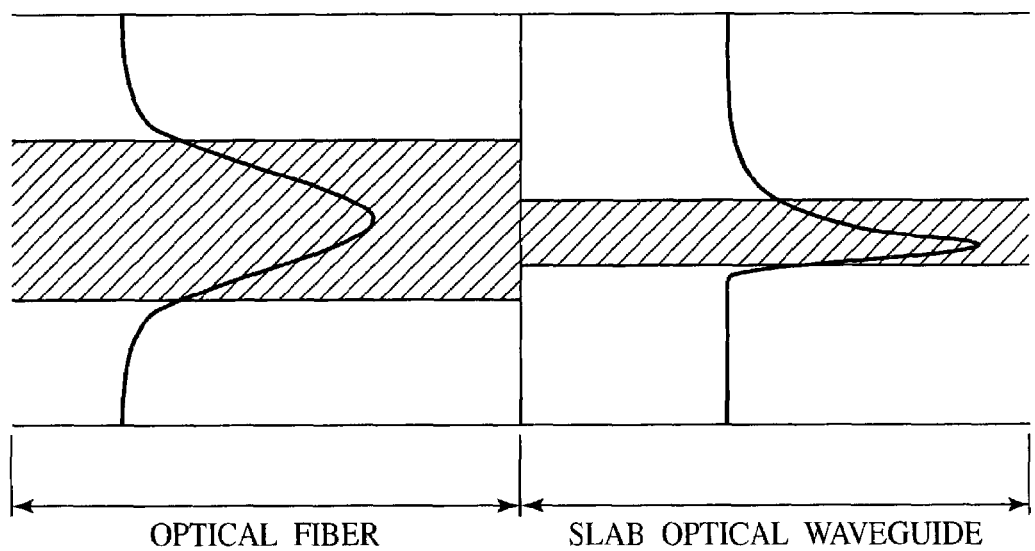
FIG. 11 is a view of changes of a mode field in the device of the conventional optical switch.

In the case that the optical fiber and the optical deflection unit are directly connected to each other, as shown in FIG. 11, because the mode field shapes are largely different from each other, the connection loss is about 2 dB at one position. In contrast to this, in the optical switch according to the present embodiment, the cores are made smaller in steps, whereby the mode field can be made smaller in steps. Resultantly, the connection loss can be improved to be about 1 dB at one position. In the constitution shown in FIGS. 1A and 1B, the connections are 4, and the total connection loss can be improved from about 8 dB to about 4 dB.

In the connection between the optical fiber and the optical switch according to the present embodiment, the optical fiber having a circular mode field and the channel optical waveguide unit having a thin mode field width must be connected to each other. When the core is square, the mode field diameter is small. Accordingly, the connection loss is very large. In order to make the connection loss between the optical fiber and the optical switch very small, it is preferable to form the core layers 24, 64 of the channel optical waveguide units 26, 66 in a rectangle having longer sides lengthwise as shown in FIG. 3.

Then, the method for fabricating the optical switch according to the present embodiment will be explained with reference to FIGS. 4A–4C, 5A–5C, 6A–6B, 7A–7B, and 8A–8B.

First the method for fabricating the input optical waveguide unit 20 will be explained with reference to FIGS. 4A–4C and 5A–5C.

Figure 4A:
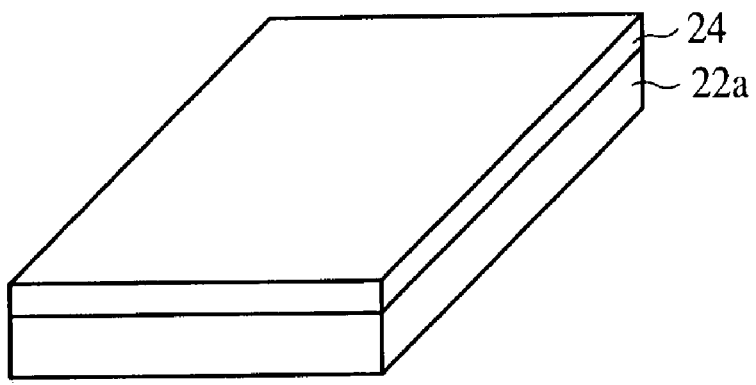
FIGS. 4A–4C, 5A–5C, 6A–6B, 7A–7B, and 8A–8B are views of the optical switch according to the first embodiment of the present invention in the steps of the method for fabricating the same, which show the method.

First, a 1 µm-thick silica layer is formed on a silica substrate by, e.g., CVD method. Thus, the core layer of the silica layer is formed on the lower clad layer 22a of the silica substrate (FIG. 4A). In forming the silica layer, are refractive index difference $\Delta$ between the lower clad layer 22a and the core layer 24 is made to be, e.g., about 0.3%. A refractive index difference can be given by, e.g., adding $GeO_2$ or others to the core layer 24.

Figure 4B:
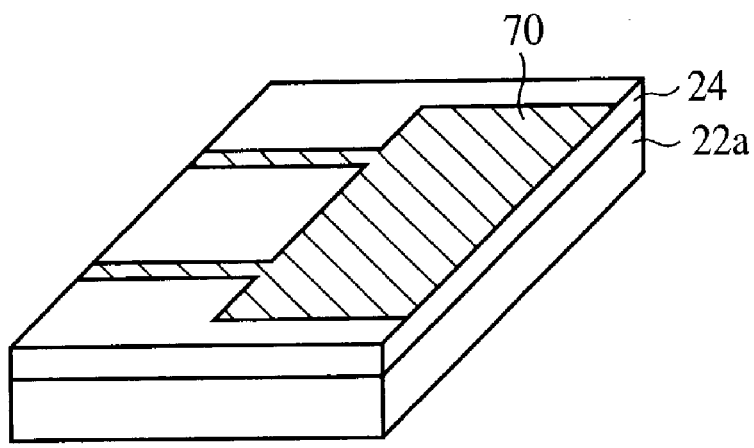

Next, a metal film is deposited on the core layer 24. Then, the metal film is patterned to form an etching mask 70 of the metal film on a slab optical waveguide in a region containing a region for the channel optical waveguides 26 to be formed in and a region for the planar lenses 28 to be formed in (FIG. 4B).

Figure 4C:
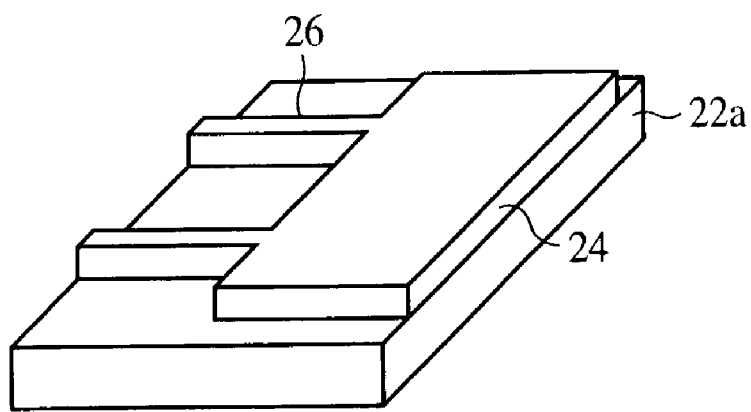

Then, with the etching mask 70 as a mask, the core layer 24 is patterned by RIE to form the channel optical waveguides 26 (FIG. 4C).

Figure 5A:
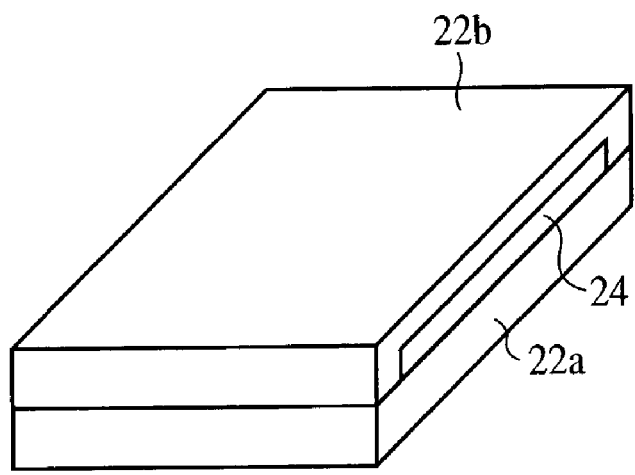

Next, a 5~10 μm-thick silica layer is grown on the entire surface by, e.g., CVD method. The core layer 24 is thus covered with the upper clad layer 22b of the silica layer (FIG. 5A). In forming the silica layer, a refractive index difference Δ between the core layer 24 and the upper clad layer 22b is made to be, e.g., about 0.3%.

Figure 5B:
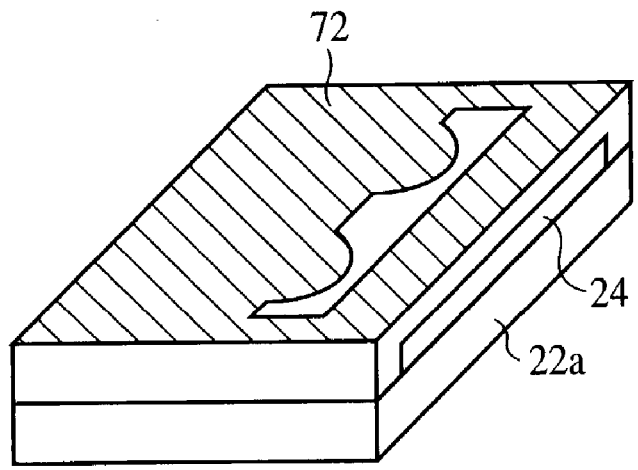

Then, a metal film is deposited on the upper clad layer 22b. The metal film is patterned to form an etching mask 72 for forming the planar lenses 28 (FIG. 5B).

Then, with the etching mask 72 as a mask, the upper clad layer 22b and the core layer 24 are patterned by RIE to form the planar lenses 28.

Figure 5C:
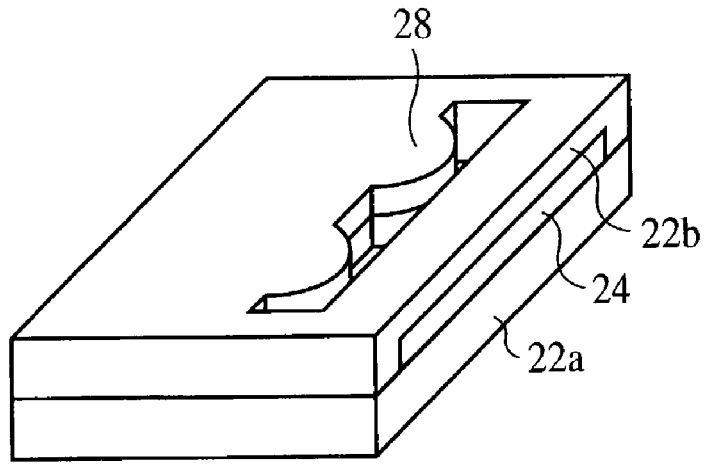

Then, the etching mask 72 is removed to complete the input optical waveguide unit 20 (FIG. 5C). The method for fabricating the output optical waveguide 60 is the same.

Figure 6A:
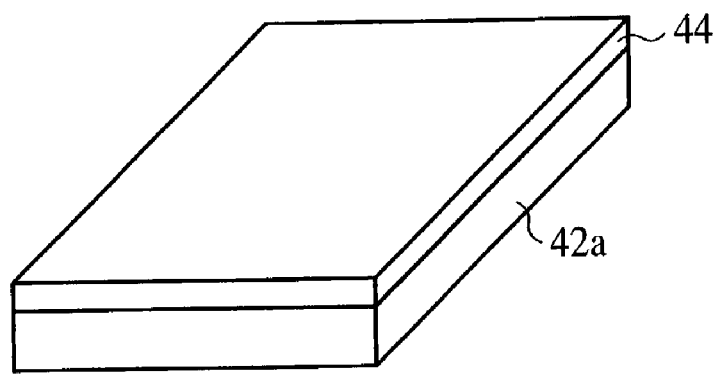
Figure 6B:
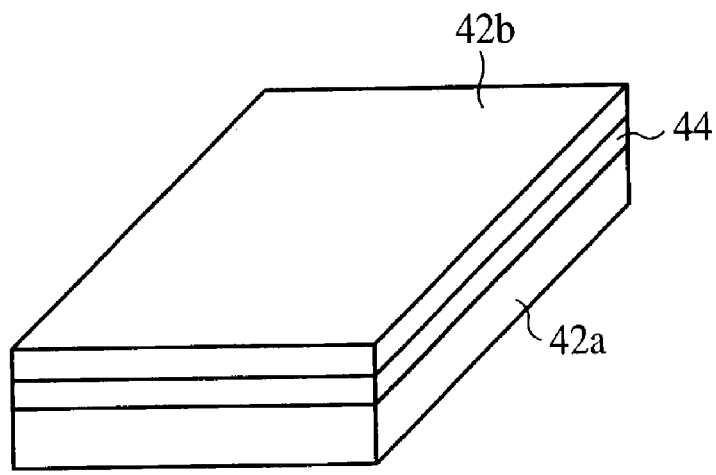

Then, the method for fabricating the slab optical waveguide unit 40 will be explained with reference to FIGS. 6A–6B.

First, a 5 μm-thick silica layer is grown on the silica substrate by, e.g., CVD method. Thus, the core layer 44 is formed on the lower clad layer 40a of the silica substrate (FIG. 6A). In forming the silica layer, a refractive index difference Δ between the lower clad layer 42a and the core layer 44 is made to be, e.g., about 0.3%.

Next, a 5~10 μm-thick silica layer is grown on the core layer 44 by, e.g., CVD method. Thus, the upper clad layer 42b of the silica layer is formed on the core layer 44 (FIG. 6B). In forming the silica layer, a refractive index Δ between the core layer 24 and the upper clad layer 42b is made to be, e.g., about 0.3%.

Thus, the slab optical waveguide unit 40 is completed. The slab optical waveguide unit 40, the input optical waveguide unit 20 and the output optical waveguide unit 60 can be concurrently formed on one silica substrate. Forming these component units by one process can make characteristics homogeneous and simplifies the fabrication process.

Figure 7A:
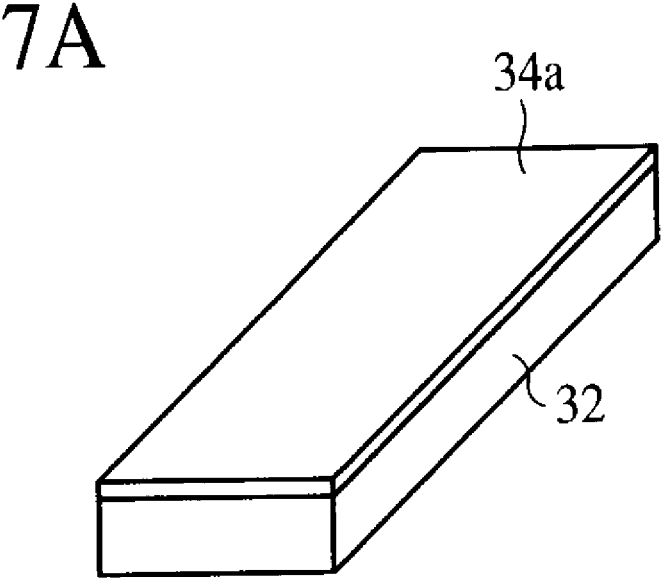
Figure 7B:
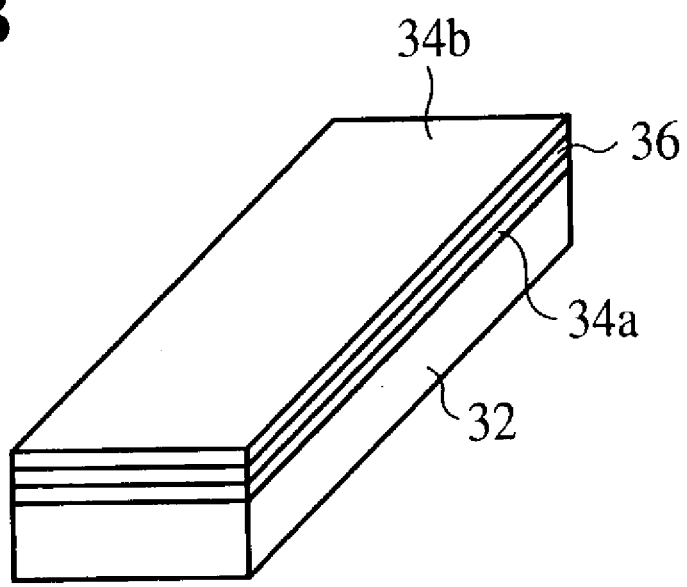

Next, the method for fabricating the optical deflection unit 30 will be explained with reference to FIGS. 7A–7B.

First, an about 1 μm-thick PLZT film is epitaxially grown on an SrTiO₃ substrate 32 (or an MgO substrate) by, e.g., sol-gel method. Thus, the lower clad layer 34a of PLZT is formed on the SrTiO₃ substrate 32 (FIG. 7A). A thickness of the PLZT film can be controlled by applying a sol-gel liquid of PLZT to the substrate a plurality of times.

Next, an about 3 μm-thick PZT film is epitaxially grown on the lower clad layer 34a by, e.g., sol-gel method. Thus, the core layer 36 of PZT is formed on the lower clad layer 34a. A thickness of the PZT film can be controlled by applying a sol-gel liquid of PZT to the substrate a plurality of times.

Then, an about 1 μm-thick PLZT film is epitaxially grown on the core layer 36 by, e.g., sol-gel method. Thus, the upper clad layer 34b of PLZT is formed on the core layer 36 (FIG. 7B). A thickness of the PLZT film can be controlled by applying a sol-gel liquid of PLZT to the substrate a plurality of times.

Next, an ITO film, for example, is deposited by, e.g., sputtering method and then patterned to form the prism-shaped electrodes 38 as shown in FIG. 1A on the upper clad layer 34b.

Thus, the optical deflection unit 30 is completed. The method for fabricating the optical deflection unit 50 is the same.

Figure 8A:
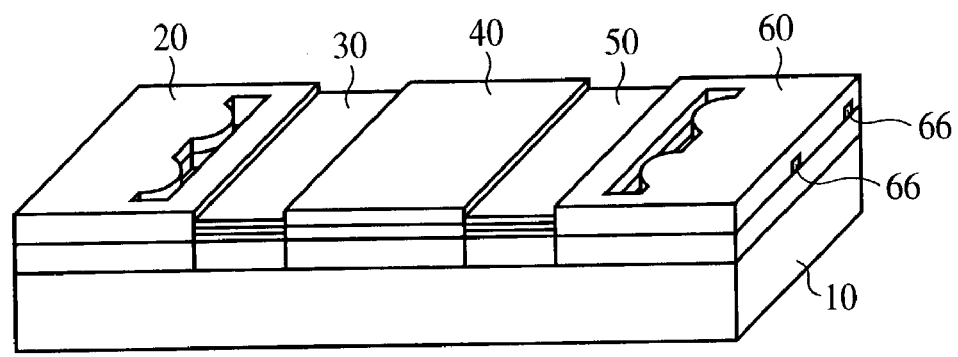

Next, the thus-formed input optical waveguide unit 20, optical deflection unit 30, slab optical waveguide unit 40, optical deflection unit 50 and output optical waveguide unit 60 are mounted on a common substrate 10. At this time, a thickness of the substrate is controlled so that the core layers of the respective components are on the same level (FIG. 8A).

Figure 8B:
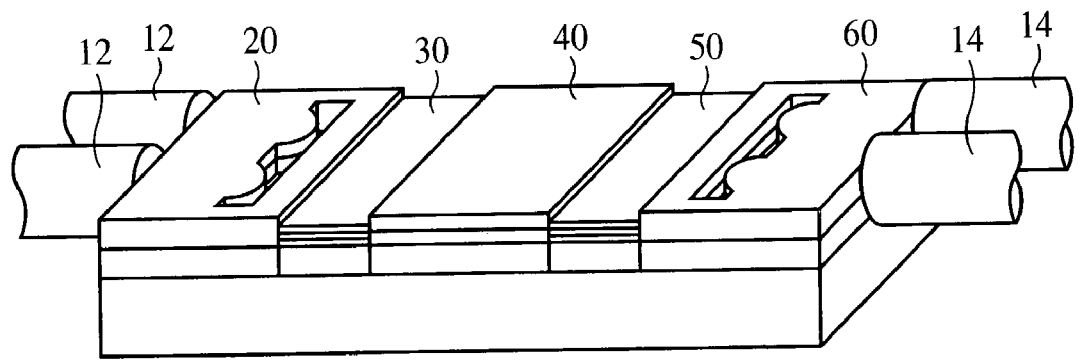

Then, the input optical fibers 12 are optically connected to the channel optical waveguides 26 of the input optical waveguide unit 20, and the output optical fibers 14 are connected to the channel optical waveguides 66 of the output optical waveguide unit 60, and the optical switch according to the present embodiment is completed (FIG. 8B).

As described above, according to the present embodiment, the optical waveguide unit is designed so that a mode field width of the optical waveguide unit positioned between the optical fiber and the optical deflection unit, which is vertical to the substrate has a value which is between a mode field diameter of the optical fiber and a mode field width of the optical deflection unit, which is vertical to the substrate, whereby connection losses between the optical fiber and the optical deflection unit can be very small.

[A Second Embodiment]

The optical switch and the method for fabricating the same according to a second embodiment of the present invention will be explained with reference to FIGS. 9 and 10. The same members of the second embodiment as those of the optical switch and the method for fabricating the same according to the first embodiment are represented by the same reference numbers not to repeat or to simplify their explanation.

Figure 9:
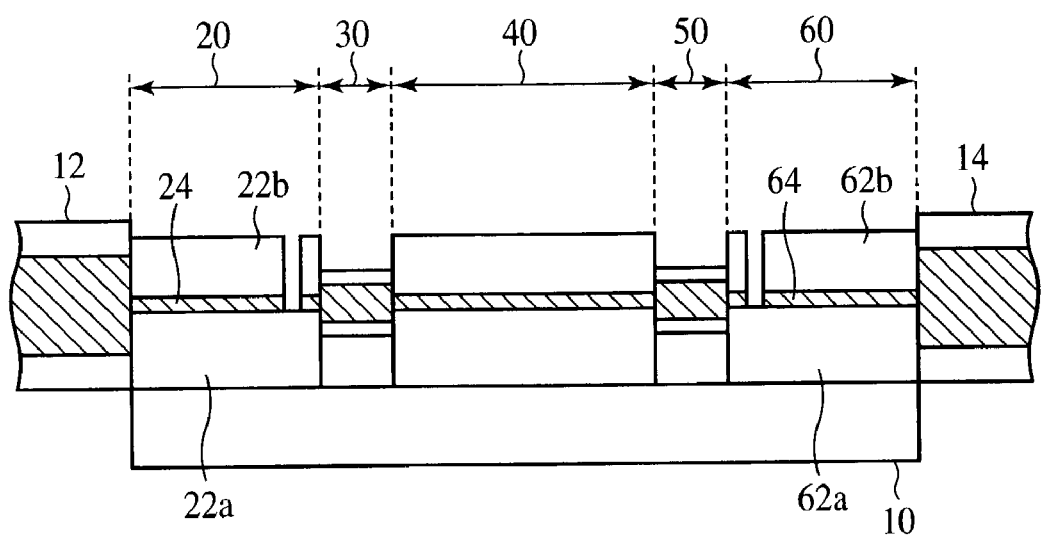
FIG. 9 is a diagrammatic sectional view of the optical switch according to a second embodiment of the present invention, which shows a structure thereof.
Figure 10:
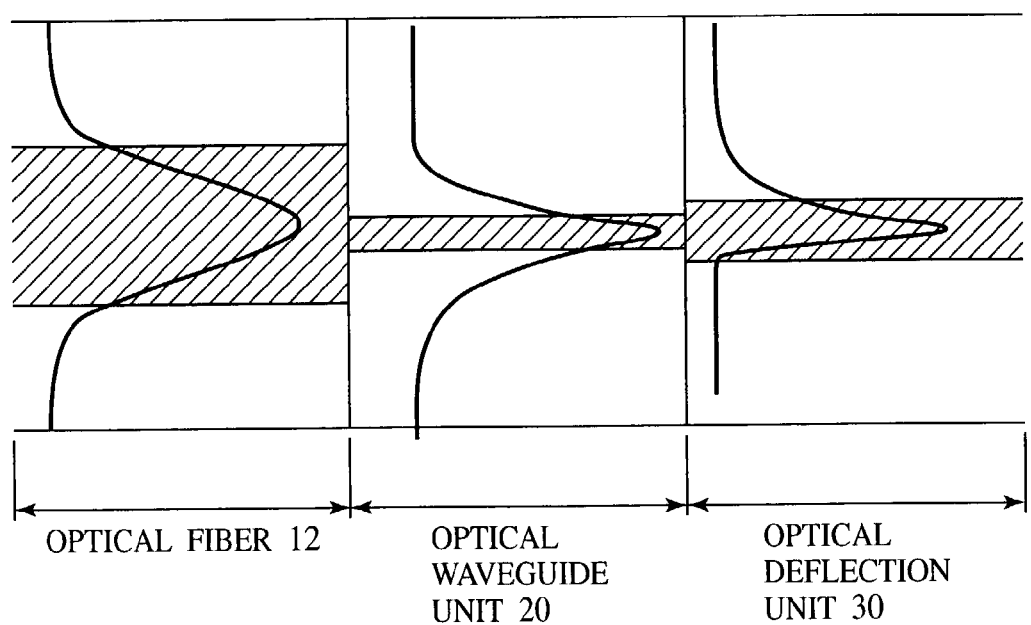
FIG. 10 is a view of changes of a mode field in the device of the optical switch according to the second embodiment of the present invention.

FIG. 9 is a diagrammatic sectional view of the optical switch according to the present embodiment, which shows a structure thereof. FIG. 10 is a view of changes of a mode field in the device of the optical switch according to the present embodiment.

The basic structure of the optical switch according to the present embodiment is the same as that of the optical switch according to the first embodiment shown in FIGS. 1A and 1B. The optical switch according to the present embodiment is characterized in that as means for controlling a mode field width of the optical waveguide units to be between a mode field width of the optical fiber and of the optical deflection unit, a thickness of the core layer of the optical waveguide unit is made thinner than a thickness of the core layer of the optical deflection unit, and a refractive index difference between the core layer of the optical waveguide unit and the clad layer is made larger than that of the first embodiment, in place of making a thickness of the core layer of the optical waveguide unit to be a value which is between a core diameter of the optical fiber and a thickness of the core layer of the optical deflection units.

That is, an input optical waveguide unit 20 comprises a lower clad layer 22a of a silica substrate, a core layer 24 of, e.g., 2 μm-thick silica layer formed on the lower clad layer 22a, and an upper clad layer 22b of, e.g., a 5~10 μm-thick silica layer formed on the core layer 24. A refractive index difference Δ between the core layer 24 and the clad layers 22 is 0.8%.

An output optical waveguide unit 60 comprises a lower clad layer 62a of a silica substrate, a core layer 64 of, e.g., 2 $\mu$m-thick silica layer formed on the lower clad layer 62a, and an upper clad layer 62b of, e.g., a 5~10 $\mu$m-thick silica layer formed on the core layer 64. A refractive index difference $\Delta$ between the core layer 64 and the clad layers 62 is 0.8%.

When the optical waveguide unit having the core layer thinner than that of the optical deflection unit and having a large refractive index difference between the core layer and the clad layers are disposed between the optical fiber and the optical deflection unit as described above, as shown in FIG. 10, the mode field of the optical waveguide unit are pointed and have a shape which approximates a shape of the mode field of the optical deflection unit. Resultantly, the connection loss can be decreased down to about 0.5 dB, which is smaller than that of the first embodiment. A total connection loss can be decreased down to about 2 dB.

As described above, according to the present embodiment, the optical waveguide units are designed so that a mode field width of the optical waveguide unit positioned between the optical fiber and the optical deflection unit, which is vertical to the substrate is made to have a value which is between a mode field diameter of the optical fiber and a mode field width of the optical deflection unit, which is vertical to the substrate, whereby the connection loss between the optical fiber and the optical deflection unit can be very small.

[Modifications]

The present invention is not limited to the above-described embodiments and can cover other various modifications.

For example, in the above-described embodiments, the present invention is applied to an optical switch, but applications of the present invention are not limited to optical switches.

The present invention is applicable widely to waveguide-type optical devices comprising optical transmission element of large mode fields, such as optical fibers, etc., and optical waveguides formed of electrooptic materials, which are optically connected with each other, the present invention is applicable not only to the above-described optical switch but also to, e.g., optical modulator.

In the first and the second embodiments, the optical waveguide unit having a constant mode field width which is vertical to the substrate are disposed between the optical fiber and the optical deflection unit, but the mode field width of the optical waveguide unit is not essentially constant. For example, a mode field width of the optical waveguide units may be changed in steps from the optical fiber toward the optical deflection unit.

In the first and the second embodiments, the slab optical waveguide unit 40 is disposed between the optical deflection unit 30 and the optical deflection unit 50, but the slab optical waveguide unit 40 is not essential. For example, the slab optical waveguide unit 40 is not necessary when the optical deflection unit 30 can provide sufficient deflection angles.

What is claimed is:

1. A waveguide-type optical device comprising:
   an optical transmission element;
   an optical waveguide optically connected to the optical transmission element; and
   a slab optical waveguide formed of an electrooptic material and optically connected to the optical waveguide, the slab optical waveguide being a laminate of slab layers having different refractive index from each other and having a width sufficiently wider than a width of a region for transmitting an optical signal,
   the optical waveguide having a mode field width in a first direction vertical to a plane of the slab optical waveguide, whose value is between a mode field width of the optical transmission element and a mode field width of the slab optical waveguide.

2. A waveguide-type optical device according to claim 1, wherein
   a core width of the optical waveguide in the first direction has a value which is between a core width of the optical transmission element and a core width of the slab optical waveguide in the first direction.

3. A waveguide-type optical device according to claim 1, wherein
   a core width of the optical waveguide in the first direction is smaller than a core width of the slab optical waveguide in the first direction; and
   a refractive index difference between a core and a clad of the optical waveguide is larger than that between a core and a clad of the optical transmission element.

4. A waveguide-type optical device according to claim 1, wherein
   the optical waveguide includes, at a connection with the optical transmission element, a channel optical waveguide having a rectangular cross section which is longer in a second direction vertical to the first direction.

5. A waveguide-type optical device according to claim 1, wherein
   the optical waveguide has the mode field width which is changed in steps from the optical transmission element toward the slab optical waveguide.

6. A waveguide-type optical device according to claim 1, wherein
   the optical transmission element is comprised of a channel optical waveguide.

7. A waveguide-type optical device according to claim 1, wherein
   the optical transmission element has a core having a circular or a rectangular cross section.

8. A waveguide-type optical device according to claim 7, wherein
   the optical transmission element is an optical fiber.

9. An optical switch comprising:
   a plurality of input optical transmission elements;
   a first optical waveguide unit having a plurality of optical waveguides optically connected to said plurality of the input optical transmission elements, respectively;
   an optical deflection unit having a slab optical waveguide formed of an electrooptic material and optically connected to said plurality of the optical waveguides of the first optical waveguide unit, the slab optical waveguide being a laminate of slab layers having different refractive index from each other and having a width sufficiently wider than a width of a region for transmitting an optical signal; and
   a plurality of output optical transmission elements optically connected to the slab optical wave guide of the optical deflection unit,
   the optical waveguides of the first optical waveguide unit respectively having a mode field width in a direction vertical to a plane of the slab optical waveguide, whose value is between a mode field width of the input optical transmission elements and a mode field width of the slab optical waveguide.

10. An optical switch according to claim 9, wherein
   a core width of the optical waveguides of the first optical waveguide unit in the direction vertical to the plane of the slab optical waveguide has a value which is between a core width of the input optical transmission elements and a core width of the slab optical waveguide in the direction vertical to the plane thereof.

11. An optical switch according to claim 9, wherein
a core width of the optical waveguides of the first optical waveguide unit in the direction vertical to the plane of the slab optical waveguide is smaller than a core width of the slab optical waveguide in the direction vertical to the plane thereof; and
a refractive index difference between a core and a clad of the optical waveguides of the first optical waveguide unit is larger than that between a core and a clad of the input optical transmission elements.

12. An optical switch according to claim 9, further comprising, between the optical deflection unit and the output optical transmission elements, a second optical waveguide unit having a plurality of optical waveguides optically connecting the slab optical waveguide of the optical deflection unit and the output optical transmission elements,
the optical waveguides of the second optical waveguide unit respectively having a mode field width in the direction vertical to a plane of the slab optical waveguide, whose value is between a mode field width of the output optical transmission elements and the mode field width of the slab optical waveguide.

13. An optical switch according to claim 12, wherein
a core width of the optical waveguides of the second optical waveguide unit in the direction vertical to the plane of the slab optical waveguide has a value which is between a core width of the output optical transmission elements and a core width of the slab optical waveguide in the direction vertical to the plane thereof.

14. An optical switch according to claim 12, wherein
a core width of the optical waveguides of the second optical waveguide unit in the direction vertical to the plane of the slab optical waveguide is smaller than a core width of the slab optical waveguide in the direction vertical to the plane thereof; and
a refractive index difference between a core and a clad of the optical waveguides of the second optical waveguide unit is larger than that between a core and a clad of the output optical transmission elements.

15. An optical switch according to claim 9, wherein
the optical deflection unit includes a first deflector group including deflectors for switching channels and a second deflector group including deflectors for restoring propagation directions of optical signals.

\* \* \* \* \*